(12) United States Patent
O'Connor et al.

(10) Patent No.: US 11,283,924 B2
(45) Date of Patent: Mar. 22, 2022

(54) SYSTEM AND METHOD FOR GUIDING AGENTS IN AN ENTERPRISE OVER AGGREGATED INTERACTIONS

(71) Applicant: Avaya Inc., Santa Clara, CA (US)

(72) Inventors: Neil O'Connor, Galway (IE); Tony McCormack, Galway (IE); John H. Yoakum, Cary, NC (US)

(73) Assignee: Avaya Inc., Santa Clara, CA (US)

( * ) Notice: Subject to any disclaimer, the term of this patent is extended or adjusted under 35 U.S.C. 154(b) by 1221 days.

(21) Appl. No.: 14/486,001

(22) Filed: Sep. 15, 2014

(65) Prior Publication Data

US 2016/0080570 A1    Mar. 17, 2016

(51) Int. Cl.
*G06F 16/2457*    (2019.01)
*G06F 16/242*     (2019.01)
(Continued)

(52) U.S. Cl.
CPC ...... *H04M 3/5133* (2013.01); *G06F 16/2453* (2019.01); *G06F 16/2456* (2019.01);
(Continued)

(58) Field of Classification Search
CPC ............ H04M 3/5233; H04M 3/5141; H04M 2203/402; H04M 3/5175; G06Q 50/01; G06Q 30/0281; G06F 3/0484; G06F 9/4446; G06F 9/4451; G06F 16/24575; G06F 16/2425; G06F 16/243;
(Continued)

(56) References Cited

U.S. PATENT DOCUMENTS 6,021,403 A * 2/2000 Horvitz ................. G06F 9/4446
706/11
8,724,795 B1 * 5/2014 Aldrich .................... H04M 3/51
379/265.02
(Continued)

OTHER PUBLICATIONS

Komutel, "A Simple Client Record, Branded to your Image, to Improve Knowledge about your Client Base", retrieved from http://www.komutel.com/en/products/t/22/screen-pop, retrieved on Jul. 24, 2014, 4 pages.

*Primary Examiner* — Tamara T Kyle
*Assistant Examiner* — Berhanu Mitiku

(57) ABSTRACT

Contact manager computer system and method to dynamically generate an aggregated context information, including: a monitoring module configured: to monitor a communication session with a customer; to determine one or more communication contexts of the customer; to determine one or more communication contexts of an agent assisting the customer; to obtain customer context information from the one or more determined communication contexts of the customer; to obtain agent context information from the one or more determined communication contexts of the agent; a processor coupled to a memory, the memory configured to store context information under control of the processor; an aggregated context information generation module to generate the aggregated context information from the obtained customer context information and the obtained agent context information; an inference module to create an inference from the aggregated context information; and a display module to display a result of the inference to an agent.

20 Claims, 6 Drawing Sheets

(51) Int. Cl.
    *G06F 16/335*     (2019.01)
    *G06F 16/9032*     (2019.01)
    *H04M 3/51*     (2006.01)
    *H04M 3/523*     (2006.01)
    *H04L 67/50*     (2022.01)
    *G06Q 10/10*     (2012.01)
    *G06F 16/2453*     (2019.01)
    *G06F 16/2455*     (2019.01)
    *H04L 67/02*     (2022.01)
    *H04L 67/306*     (2022.01)
    *H04L 67/14*     (2022.01)

(52) U.S. Cl.
    CPC .. *G06F 16/24532* (2019.01); *G06F 16/24537* (2019.01); *G06F 16/24539* (2019.01); *G06F 16/24542* (2019.01); *G06F 16/24544* (2019.01); *G06F 16/24549* (2019.01); *G06Q 10/10* (2013.01); *H04L 67/22* (2013.01); *H04M 3/523* (2013.01); *H04L 67/02* (2013.01); *H04L 67/14* (2013.01); *H04L 67/306* (2013.01); *H04M 2203/2038* (2013.01); *H04M 2203/401* (2013.01)

(58) Field of Classification Search
    CPC ............. G06F 16/24522; G06F 16/248; G06F 16/9535; G06F 16/3338
    See application file for complete search history.

(56) References Cited

U.S. PATENT DOCUMENTS

| | | | |
|---|---|---|---|
| 2013/0297547 A1* | 11/2013 | Ding | G06N 5/02 706/46 |
| 2014/0297268 A1* | 10/2014 | Govrin | G06N 5/04 704/9 |
| 2015/0088998 A1* | 3/2015 | Isensee | H04L 51/02 709/206 |
| 2015/0350435 A1* | 12/2015 | Connolly | G06Q 10/0639 379/265.03 |
| 2015/0350444 A1* | 12/2015 | Glass | H04L 67/22 379/265.13 |

* cited by examiner

SYSTEM AND METHOD FOR GUIDING AGENTS IN AN ENTERPRISE OVER AGGREGATED INTERACTIONS

BACKGROUND

Field

Embodiments of the present invention generally relate to a system and method to provide assistance to agents of an enterprise and particularly to a system and method for guiding agents of the enterprise to handle incoming contacts.

Description of Related Art

Contact centers are employed by many enterprises to service inbound and outbound contacts or customers. A primary objective of contact center management ultimately is to maximize contact center performance and profitability. An ongoing challenge in contact center administration is monitoring and optimizing contact center efficiency usage of its available resources. The contact center efficiency is generally measured by metrics such as Service Level Agreement (SLA), Customer Satisfaction (CSAT), and match rate. Contact center resources may include agents, communication assets (e.g., number of voice trunks, number and bandwidth of video trunks, etc.), computing resources (e.g., a speed, a queue length, a storage space, etc.), and so forth.

Service level is one measurement of the contact center efficiency. Service level is typically determined by dividing the number of contacts accepted within a specified period by the number accepted plus number that were not accepted, but completed in some other way (e.g., abandoned, given busy, canceled, flowed out). Service level definitions may vary from one enterprise to another.

Match rate is another indicator used in measuring the contact center efficiency. Match rate is usually determined by dividing the number of contacts accepted by a primary skill level agent within a period of time by the number of contacts accepted by any agent in a queue over the same period. An agent with a primary skill level is one who typically may handle contacts of a certain nature more effectively and/or efficiently as compared to an agent of lesser skill level. There are other contact center agents who may not be as proficient as the primary skill level agent, and those agents are identified either as skill level agents or backup skill level agents. As can be appreciated, contacts received by a primary skill level agent are typically handled more quickly and accurately or effectively (e.g., higher revenue attained) than a contact received by a secondary or even backup skill level agent. Thus, it is an objective of most contact centers to optimize match rate along with the service level.

In addition to service level and match rate performance measures, contact centers use other Key Performance Indicators ("KPIs"), such as revenue, estimated, actual, or predicted wait time, average speed of answer, throughput, agent utilization, agent performance, agent responsiveness and the like, to calculate performance relative to their Service Level Agreements ("SLAs"). Operational efficiency is achieved when the KPIs are managed near, but not above, SLA threshold levels.

Throughput is a measure of the number of contacts/ contact requests or work requests that may be processed in a given amount of time. Agent utilization is a measure of how efficiently the agents' time is being used. Customer service level is a measure of the time customers spend waiting for their work to be handled. Company contact center customers wish to provide service to as many requests as possible in a given amount of time, using the least number of agents to do so, and minimizing the wait time for their customers that may increase the Service Level Agreement (SLA) of the contact center. Further, the contact center may also have to maintain the Customer Satisfaction (CSAT) metrics in order to maintain the KPIs of the contact center. For this purpose, agents may have to maintain the quality of services provided to the customers through multimedia (e.g., voice contacts, video contacts, emails, etc.).

Generally, in a contact center, when a customer makes a call, for example, through an Interactive Voice Response (IVR) Unit, the call is routed to an agent based on the customer's input. The agent is selected based on some parameters, for example, an agent's skill, a type of call, a customer's preferred language, etc. Further, the agent is then provided with customer information received from the customer's input.

However, the information provided to the agent is sometimes incomplete. A customer interaction may extend over several sessions with the agent, or may involve a session that includes transfers among more than one agent. Conventional techniques do not provide provisions to tailor or modify this information by aggregating information over multiple sessions or multiple agents.

Some systems of the known art provide a customizable screen pop without any form of predictive intelligence features, resource reservation, and/or selectively filtering data. Such systems may collect and display target data, but behind their screen display do not execute customer relationship rules based upon its target data to create a new and resulting outcome (e.g., a business decision or service afforded to) based upon the customer relationship rules.

Further, the agents of the contact center may want to provide a higher level of service to gold-rated customers (i.e., customers having higher revenue products/services of the contact center), and thus it would be helpful for agents to have as much information as available. However, a manual process to aggregate this information is a complex, time-consuming and error-prone process.

There is thus a need for a system and method for guiding agents of an enterprise to improve dynamically handling of incoming contacts.

SUMMARY

Embodiments in accordance with the present invention may further provide a computer-implemented method for aggregating contextual information about a customer, e.g., contextual information derived from one or more communication sessions with a customer. The communications sessions are not limited to any particular type of technology, and may include Web Real-Time Communications (WebRTC). The contextual information about the customer may come from, be supplied by, or derived from information from either the customer, or one or more contact center agents responding to the customer contact. The method includes determining one or more WebRTC contexts of at least one customer to obtain customer context information of the at least one customer; generating at least one aggregated context information based on the obtained customer context information from the one or more determined WebRTC contexts; and displaying the at least one aggregated context information to one or more agents. Aggregated context information may include inferences and conjecture drawn from the determined WebRTC contexts.

Embodiments in accordance with the present invention may further provide a computer-implemented method for guiding at least one agent during a communication session. The method includes determining one or more WebRTC contexts of at least one customer and obtaining customer context information of the at least one customer from the one or more determined browser activities; selecting at least one browsing activity from the one or more determined WebRTC contexts of the at least one customer; generating at least one aggregated context information based on the customer context information of the at least one selected browsing activity; and displaying the at least one aggregated context information to one or more agents. Aggregated context information may include inferences and conjecture drawn from the determined WebRTC contexts.

Embodiments of the present invention may provide a number of advantages depending on its particular configuration. First, embodiments of the present application provide a system and a method for guiding agents of an enterprise to improve handling of incoming contacts. Embodiments of the present application provide an aggregated context information to guide agents during a communication session with a customer. Next, embodiments of the present application dynamically generate an aggregated context information based on customer context information from WebRTC contexts of a customer and agent. The WebRTC contexts of the customer are monitored and relevant words and/or phrases from the customer context information are selected. Further, based on these words and/or phrases, the aggregated context information is generated for the future contact/customer session. Also, an aggregated context information may be tailored by using the monitored context information of the WebRTC contexts of the customer. The aggregated context information is then stored in a database of the enterprise.

Embodiments in accordance with the present disclosure may provide a system and method to accumulate insight into a complex query that has arrived at a contact center from a customer. For those customer contacts that end up being transferred due to the nature of the query and/or an imprecise match of the agent's knowledge with the current customer request, embodiments intelligently aggregate WebRTC context, with a view to anticipating and temporarily reserving a suitable resource that is capable of resolving the prevailing issue.

Further, embodiments of the present application dynamically may generate the aggregated context information before the customer initiates a communication session with an agent of the enterprise. The tailored aggregated context information may be displayed to the agent when the customer initiates the communication session with the agent.

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

Figure 1A:
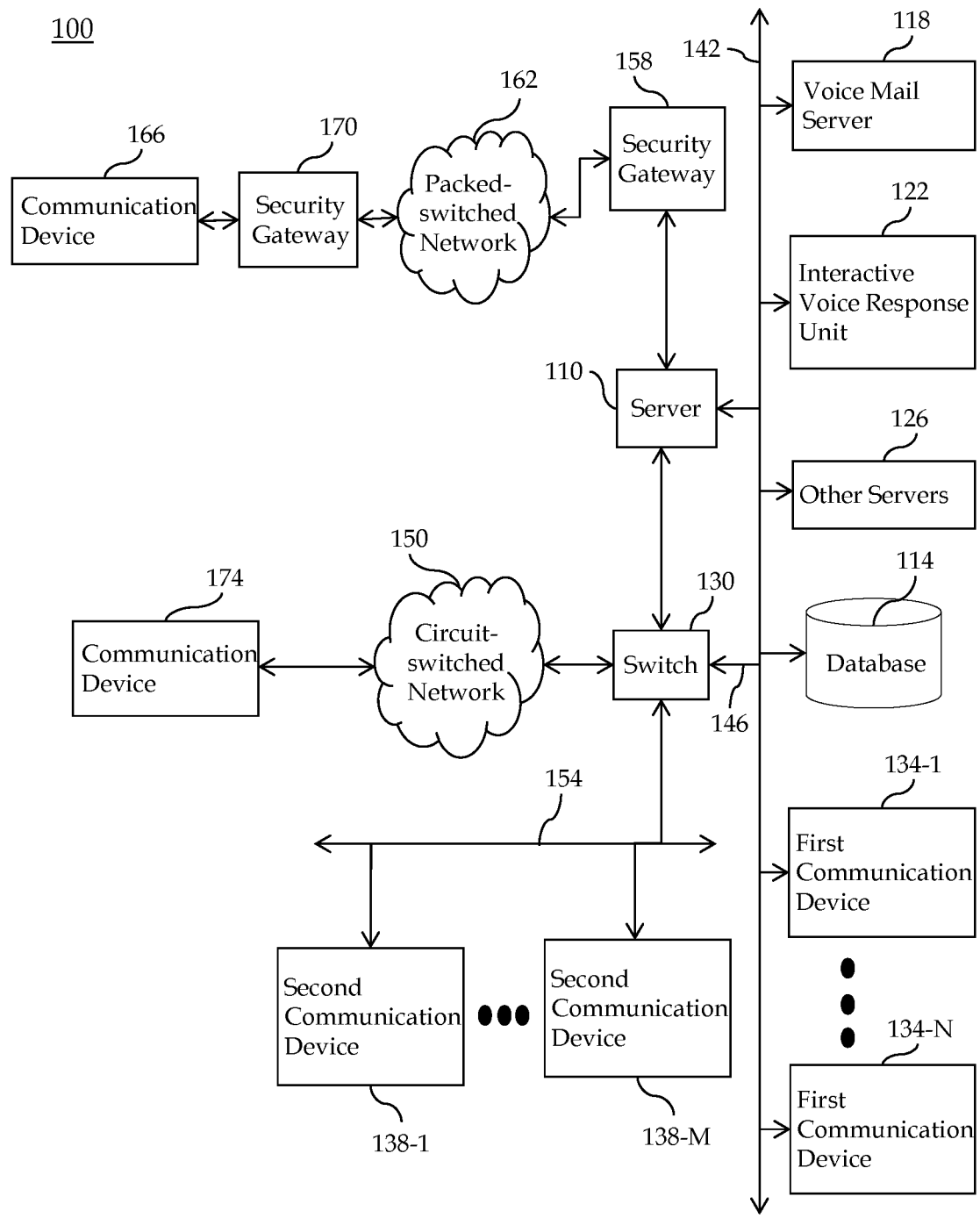
FIG. 1A illustrates a block diagram depicting a contact center, according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention will be illustrated below in conjunction with an exemplary communication system, e.g., the Avaya Aura® system. Although well suited for use with, e.g., a system having an Automatic Call Distribution (ACD) or other similar contact processing switch, embodiments of the present invention are not limited to any particular type of communication system switch or configuration of system elements. Those skilled in the art will recognize the disclosed techniques may be used in any communication application in which it is desirable to provide improved contact processing.

In contrast to some systems of the known art that provide a customizable screen pop without any form of predictive intelligence features, resource reservation, and/or selectively filtering data, embodiments are able to execute customer relationship rules based upon its target data to create a new and resulting outcome (e.g., a business decision or service afforded to) based upon the customer relationship rules.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

The terms "customer" and "contact" may be used interchangeably in certain context of this disclosure of the present invention when referring to one or more persons/entity contacting a contact center, usually to reach an IVR system and/or one or more agents for assistance. In another context contemplated by the present invention, a "customer" may have more than one contact with the contact center at, or nearly at, the same time. For example, a customer may communicate with a contact center by way of telephone and by way of a chat, thus counting as one customer but two contacts.

Web Real-Time Communications (WebRTC) as used herein is an open framework for the web that enables Real Time Communications (RTC) in the browser. It includes the fundamental building blocks for high quality communications on the web such as network, audio and video components used in voice and video chat applications. These components, when implemented in a browser, can be accessed through a Javascript API, enabling developers to easily implement their own RTC web app. WebRTC is being standardized on an API level by the World Wide Web Consortium (W3C) and at the protocol level by the Internet Engineering Task Force (IETF).

The term "WebRTC session" as used herein refers to a communication session using a WebRTC protocol. The term "WebRTC context" as used herein refers to information (including data and metadata) related to a WebRTC session. For example, WebRTC context may include the identity of participants of a WebRTC session, text that was exchanged, transcription of voice communication, documents that were exchanged, other informational content that was transmitted, date/time, agent notes, and so forth. WebRTC is an API definition drafted by the World Wide Web Consortium (W3C) that supports browser-to-browser applications for voice calling, video chat, and peer-to-peer file sharing without plug-ins. WebRTC-enabled sessions may include a WebRTC data channel, which is an interface that represents a bi-directional data channel between two peers.

A WebRTC session refers to the link between a customer browser and a web server belonging to an enterprise that the customer is in communication with. For example, the information from the web server would traverse the session, and be displayed on the customer's browser. The WebRTC context is a deposit or collection of data related to the activity of that session, which resides in the enterprise. For example, the WebRTC context might remain almost empty while the customer uses the session to browse information about low-margin products. Once a high-margin product is being browsed by the customer, at this point the enterprise might start adding to the context information.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, embodiments may include a tangible storage medium or distribution medium and prior art-recognized equivalents and successor media, in which the software embodiments of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Modules may also be referred to herein as components or snap-ins.

The term "switch" or "server" as used herein should be understood to include a Private Branch Exchange (PBX), an ACD, an enterprise switch, or other type of communications system switch or server, as well as other types of processor-based communication control devices such as media servers, computers, adjuncts, etc.

FIG. 1A shows an illustrative embodiment of the present invention. A contact center 100 comprises a server 110, a set of data stores or databases 114 containing contact or customer related information, resource or agent related information and other information that may enhance the value and efficiency of the contact processing, and a plurality of servers, namely a voice mail server 118, an Interactive Voice Response unit (e.g., IVR) 122, and other servers 126, a switch 130, a plurality of working agents operating packet-switched (first) communication devices 134-1-N (such as computer work stations or personal computers), and/or circuit-switched (second) communication devices 138-1-M, all interconnected by a Local Area Network (LAN) 142, (or Wide Area Network (WAN)). In another embodiment of the present invention, the customer and agent related information may be replicated over multiple repositories.

The servers may be connected via optional communication lines 146 to the switch 130. As will be appreciated, the other servers 126 may also include a scanner (which is normally not connected to the switch 130 or Web Server), VoIP software, video call software, voice messaging software, an IP voice server, a fax server, a web server, an email server, and the like. The switch 130 is connected via a plurality of trunks to a circuit-switched network 150 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. In an embodiment of the present invention, the security gateway 158 (as shown in FIG. 1A)

may be Avaya Inc.'s, G700 Media Gateway™ and may be implemented as hardware such as via an adjunct processor (as shown) or as a chip in the server 110.

The switch 130 and/or server 110 may be any architecture for directing contacts to one or more communication devices. In some embodiments of the present invention, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX) based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya, or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

The first communication devices 134-1-N are packet-switched and may include, for example, IP hardphones such as the Avaya Inc.'s, 4600 Series IP Phones™, IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched devices. Each of the second communication devices 138-1-M corresponds to one of a set of internal extensions Ext-1-M, respectively. The second communication devices 138-1-M may include, for example, wired and wireless telephones, PDAs, H.320 videophones and conferencing units, voice messaging and response units, traditional computer telephony adjuncts, and any other communication devices.

It should be noted that the embodiments of present invention do not require any particular type of information transport medium between switch, or server and first and second communication devices, i.e., the embodiments of the present invention may be implemented with any desired type of transport medium as well as combinations of different types of transport channels.

The packet-switched network 162 may be any data and/or distributed processing network, such as the Internet. The packet-switched network 162 typically includes proxies (not shown), registrars (not shown), and routers (not shown) for managing packet flows.

The packet-switched network 162 as shown in FIG. 1A is in communication with a first communication device 166 via a security gateway 170, and the circuit-switched network 150 with an external second communication device 174.

In one configuration, the server 110, the packet-switched network 162, and the first communication devices 134-1-N are Session Initiation Protocol (SIP) compatible and may include interfaces for various other protocols such as the Lightweight Directory Access Protocol (LDAP), H.248, H.323, Simple Mail Transfer Protocol (SMTP), IMAP4, ISDN, E1/T1, and analog line or trunk.

It should be emphasized the configuration of the switch 130, the server 110, user communication devices, and other elements as shown in FIG. 1A is for purposes of illustration only and should not be construed as limiting embodiments of the present invention to any particular arrangement of elements.

Further, the server 110 is notified via the LAN 142 of an incoming service request or work item by the communications component (e.g., switch 130, a fax server, an email server, a web server, and/or other servers) receiving the incoming service request as shown in FIG. 1A. The incoming service request is held by the receiving telecommunications component until the server 110 forwards instructions to the component to forward or route the contact to a specific contact center resource, such as the IVR unit 122, the voice mail server 118, and/or first or second telecommunication device 134-1-N, 138-1-M associated with a selected agent.

Figure 1B:
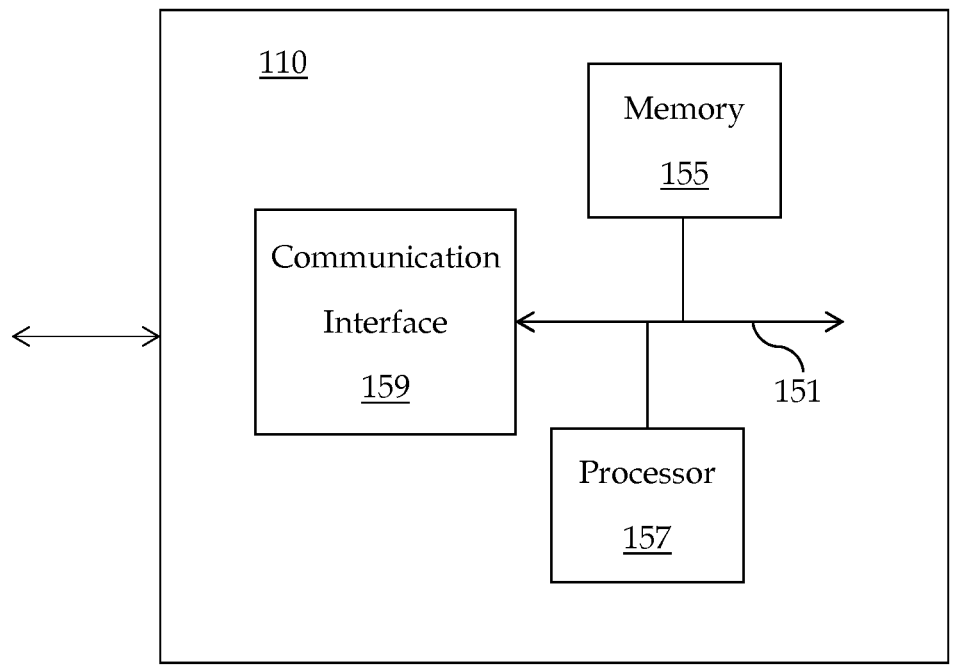
FIG. 1B illustrates a high level hardware abstraction of a block diagram of a server, according to an embodiment of the present invention.

FIG. 1B illustrates at a relatively high-level hardware abstraction of a block diagram of a server such as the server 110, in accordance with an embodiment of the present invention. The server 110 may include an internal communication interface 151 that interconnects a processor 157, a memory 155 and a communication interface circuit 159. The communication interface circuit 159 may include a receiver and transmitter (not shown) to communicate with other elements of the contact center 100 such as the switch 130, the security gateway 158, the LAN 142, and so forth. By use of programming code and data stored in the memory 155, the processor 157 may be programmed to carry out various functions of the server 110.

Although embodiments are discussed with reference to client-server architecture, it is to be understood the principles of embodiments of the present invention apply to other network architectures. For example, embodiments of the present invention apply to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, embodiments of the present invention do not require the presence of packet- or circuit-switched networks.

The term "switch" or "server" as used herein should be understood to include a Private Branch Exchange (PBX), an ACD, an enterprise switch, an enterprise server, or other type of telecommunications system switch or server, as well as other types of processor-based communication control devices such as media servers, computers, adjuncts, etc.

Figure 2:
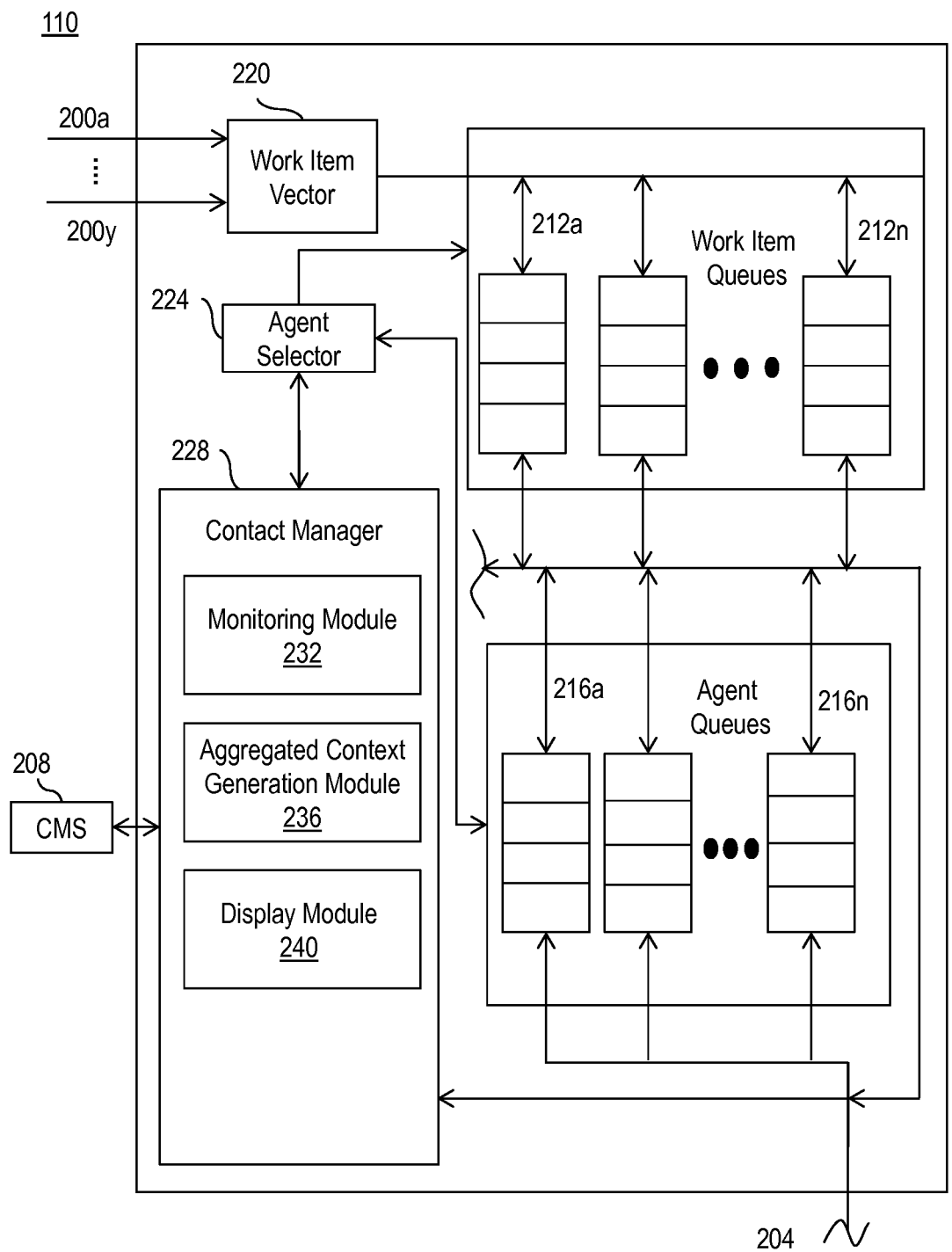
FIG. 2 illustrates a functional block diagram of the server that may be used in the contact center, according to an embodiment of the present invention.

Referring to FIG. 2, one possible configuration of the server 110 is depicted at a relatively high level of functional abstraction, according to an embodiment of the present invention. The server 110 is in communication with a plurality of contact or customer communication lines 200*a-y* (which may be one or more trunks, phone lines, etc.) and an agent communication line 204 (which may be a voice-and-data transmission line such as the LAN 142 and/or a circuit switched voice line). The server 110 may include Avaya Inc.'s Operational Analyst™ (OA) with On-Line Analytical Processing (OLAP) technology or a Call Management System (CMS) 208 that gathers contact records. OA and CMS will hereinafter be referred to jointly as CMS 208.

As shown in FIG. 2, among the data stored in the server 110 is a set of contact or work item queues 212a-n and a separate set of agent queues 216a-n. Each contact queue 212a-n corresponds to a different set of agent queues, as does each agent queue 216a-n. Conventionally, contacts are either prioritized or are queued in individual ones of the contact queues 212a-n in their order of priority or are queued in different ones of a plurality of contact queues that correspond to a different priority. Likewise, each agent's queues are prioritized according to his or her level of expertise or skill in that queue, and agents are queued in either individual ones of agent queues 216a-n in their order of expertise level or in different ones of a plurality of agent queues 216a-n that correspond to a queue and each one of which corresponds to a different expertise level. In an embodiment of the present invention, the agent queue 216a-n may include a set of reserve agents queue in the contact center 100.

According to an embodiment of the present invention, included among the control programs in the server 110 is a work item vector 220. Contacts or calls incoming to the contact center 100 are assigned by the work item vector 220 to different work item queues 212a-n based upon a number of predetermined criteria, including a customer's identity, customer needs, contact center needs, current contact center queue lengths, a customer value, and an agent skill that is required for proper handling of the contact. Agents who are available for handling work items are assigned to the agent queues 216a-n based upon the skills that they possess. An agent may have multiple skills, and hence may be assigned to multiple agent queues 216a-n simultaneously. Furthermore, an agent may have different levels of skill expertise (e.g., skill levels 1-N in one configuration or merely primary skill levels and secondary skill levels in another configuration), and hence may be assigned to different agent queues 216a-n at different expertise levels.

In one configuration, the contact center 100 is operated by a contact center operator (e.g., a supervisor or a manager of the contact center 100), and each of the work item queues 212a-n, and possibly each of the agent queues 216a-n, corresponds to a different client. Each client may have a separate Service Level Agreement (SLA) or other type of performance measurement agreement with the contact center operator regarding performance expectations, goals, requirements or specifications for the client's respective queue(s).

Further, embodiments in accordance with the present invention may include, among the programs executing on the server 110, an agent selector 224 and a contact manager computer system 228. The agent selector 224 and the contact manager computer system 228 are stored either in the main memory or in a peripheral memory (e.g., disk, CD ROM, etc.) or some other computer-readable medium of the contact center 100. Further, the agent selector 224 monitors the occupants of the work item and agent queues 212a-n and 216a-n, respectively, and contact center objectives, rules, and policies and assigns agents to service work items.

The agent selector 224 distributes and connects these work items to communication devices of available agents based on the predetermined criteria noted above. When the agent selector 224 forwards a contact (or first work item) to an agent, the agent selector 224 also forwards customer-related information from the database 114 to the agent's desktop or computer work station for previewing and/or viewing (such as by a pop-up display) to enable the agent for providing better services to the customer. Depending on the contact center configuration, the agent selector 224 may reallocate the work items to the agents of the contact center 100. The agents process the contacts or work items sent to them by the agent selector 224.

In an embodiment of the present invention, the agent and their associated data are maintained and updated in the database 114 of the contact center 100.

Embodiments use an identification of a customer session as an index (e.g., a key) to aggregate a plurality of communication contexts in a contact center environment in order to provide improved handling of a customer query. For example, suppose a customer creates a WebRTC session with a contact center, and deals with a first Agent before being transferred to a second Agent. The single WebRTC session in this example includes a first WebRTC context with the first Agent and a second WebRTC context with the second Agent. The WebRTC session may later be transferred to another agent to start a third WebRTC context, and so forth. Unseen to the customer, the contact center agents may be struggling to deal with a difficult query. In order to deal with the query, the contact center agents may be using their browsers to obtain additional information from other sources than customer-provided information.

In order to lessen disruptions during various transfers, it would be advantageous to improve continuity by sharing information from one agent to another, and in particular to share information by sharing WebRTC contexts among the various contexts of a WebRTC session. From the shared WebRTC contexts, various business-related insights may be gleaned, e.g., a prediction of problems and needs, and proactively seeking solutions to the anticipated problems and needs. Furthermore, if the customer contacts the contact center again in the future to discuss the same or related problem, issue, or topic, then and upon realization that the present WebRTC session is related to the previous WebRTC session, embodiments may add both WebRTC sessions and their constituent WebRTC contexts into an overarching WebRTC session. Alternatively, one of the WebRTC sessions (e.g., the second WebRTC session) and its constituent WebRTC contexts could be folded into the other WebRTC session (e.g., first WebRTC session).

The WebRTC context of the customer may be aggregated with the WebRTC contexts of the agents, using the index associated with the customer session. The context for the agent may include a mapping rule to assist the agent in case the WebRTC session needs to be forwarded to another agent. For example, based upon keywords or other information developed during the WebRTC session, the rules could identify the ideal skill to which the WebRTC session should next be transferred. As the aggregated WebRTC context builds inside the contact center, a more precise resolution of the problem is generated.

The contextual information about the customer may come from, be supplied by, or derived from information from either the customer, or one or more contact center agents responding to the customer contact. The contribution of context from the agents (in addition to contribution of context from the customer) to the aggregated context is an improvement over the known art. For example, after the contact arrives at the contact center, several agents may perform browser actions in an effort to resolve the query. Each action of each agent contributes to the aggregated context.

Furthermore, embodiments in accordance with the present disclosure may use the aggregated context to identify suitable resources to expedite the resolution of the customer query. For example, based on a dynamic set of context information, embodiments may identify, deduce or infer that the customer would be best served by transferring the customer to a resource X (e.g., agent X) or skill Y (e.g., an agent possessing skill Y). If resource X or skill Y is not immediately available, the relevant skill or resource may be reserved for use by the customer when available. The set may be dynamic because the amount of context information needed to make the relevant identification, deduction or inference may vary depending upon circumstances such as the type of information or assistance sought (e.g., a request for medical information or help may require more information than a non-medical product support inquiry). The understanding of the nature of the query may evolve as the amount of aggregated context grows. The dynamic set of context information would not necessarily be displayed to the current agent. Rather, an inference may be made from the dynamic set of context information, and a dynamically generated control resulting from the inference may be displayed to the current agent. For example, the dynamically generated control may include a control activatable by an agent to perform the recommended transfer of the caller to another resource or skill.

Although the exemplary usage above and further examples below are described in reference to WebRTC sessions, embodiments are not limited to usage with WebRTC sessions. Embodiments are usable with other communication protocols that provide substantially similar capabilities, including the ability to exchange information either sought by or provided by a customer (e.g., a web page or form submission on a web page) to/from a server, and a data channel to provide metadata or the like about the customer or the communication session. The following process illustrates an example of operation of an embodiment in accordance with the present disclosure:

First, while a customer is browsing at a vendor's web site (e.g., an insurer's web site) using a WebRTC-enabled browser, an entry may be created in a context store memory within a contact center associated with the vendor. The context store entry is created with a unique ID that will be used to identify this WebRTC session.

Second, the customer may wish to purchase a life insurance policy, and so becomes enqueued in the contact center via a general-purpose sales queue. The customer eventually may be connected to a first agent based upon information developed so far about the customer and his call.

Third, the first agent may have trouble fulfilling one or more requests from the customer. The agent may check various resources, including US Regulations on selling life insurance, and may then transfer the session to the agent's supervisor.

Fourth, embodiments in accordance with the present disclosure use a module of the WebRTC-enabled browser and a WebRTC data channel to keep updating an aggregated repository of insights in a central location in a context store. Insights may be understood as including facts, and also inferences, conjectures or conclusions drawn from those facts. A conjecture may have a lesser degree of certainty compared to an inference or a conclusion, and a conjecture may be indicated to the user as having a lesser degree of certainty (e.g., labeled as conjecture, or by use of a confidence score). Inferences, conjectures and conclusions may be identified as being inferences, conjectures and conclusions, and may include a respective confidence score. For example, if a customer browses a car review (e.g., consumerreports.org) or shopping web site (e.g., cars.com), then an inference is that the customer is shopping for a car, and a conjecture is that the customer may want information about financing. If it is also known that the customer has an old car or a car close to the end of a lease term, then the inference and conjecture would have a higher confidence score. The result of the conjecture might be a control that allows transfer of the customer to an agent who specializes in auto financing (see eighth step, below). Embodiments of the present invention may have selected certain information from the customer and agent browsing activity (including the agent's contact center desktop application program), and aggregated this in the Context Store under a unified entry for this customer WebRTC session.

Fifth, in a further embodiment, a separate component that implements certain rules may examine this aggregated context information in the Context Store. The component may then use the examined information to identify resource(s) that should be pushed to the current agent(s) who are dealing with the customer. The identified resources may also mark the resources to be pushed to future agents who may be added during the lifecycle of the customer WebRTC session.

Sixth, during first agent activity, a Desktop Services module may update the context store with the agent actions, including checking regulations on life insurance policies. In one embodiment, a WebRTC data channel is used to send this activity from the agent desktop to the Desktop Services module, and from there to the contact store.

Seventh, when the session is transferred from the first agent to a supervisor, a module of the embodiment checks the contact store content for the information gleaned via WebRTC. By examining the cumulative information of the customer plus the agent checking of US legal requirements, embodiments may infer, hypothesize or conclude that a problem arose due to the agent not being licensed in the state of the customer's residence. The system may automatically identify a suitably qualified agent, and may temporarily reserve this agent. A portion of the agent capacity may be reserved. For example, if the agent is able to handle voice calls and text communications simultaneously, the agent's voice capacity may be reserved without reserving the agent's text communications capacity.

Eighth, when the session is presented to the supervisor, a desktop services module may dynamically include a special control, visible to the supervisor, that will result in a single step transfer to the suitably-qualified, reserved agent.

Ninth, the supervisor confirms with the customer that a transfer to the agent is acceptable, and the supervisor then activates the specially-added control to transfer the customer to the reserved agent.

In the example given, only two deposits of WebTRC-sourced information were inserted into the contact store, i.e., that of the customer and that of the agent. Embodiments in accordance with the present disclosure can be applied to conferences and/or to scenarios where several actors are separately involved in dealing with a difficult-to-answer query.

Embodiments in accordance with the present disclosure expedite the convergence on a resolution for the query by examining the behavior of the involved persons, and using WebRTC enablers to anticipate suitable resources to assist these efforts. Note that in the example above, the ideal resolution to the problem as determined by the present invention was temporarily reserved for immediate use Returning again to FIG. 2, there is presented an exemplary embodiment of the present invention, the contact manager computer system 228 is configured to determine contexts of a customer, an agent, and related context information of the customer and/or agent. In an embodiment of the present invention, the customer may generate the contexts on a compatible browser (e.g., a WebRTC enabled browser). Further, the contact manager computer system 228 is configured to generate an aggregated context information based on the aggregated context information of the determined contexts of the customers and/or agents. The additions to the aggregated context are specific and targeted. Not all activity may be deemed relevant to be added to the aggregated context. For example, if a customer is put on hold, there is ordinarily little meaningful knowledge in this action that helps figure out what the customer query relates to. However, if the agent uses their presence client to check what colleagues are available in a Futures Trading Department, then this query may be highly meaningful. In general, the aggregated context is a surgically- and specifically-accumulated deposit of information. In turn, the aggregated context may be parsed by a further component of the present invention to determine what resource(s) may be of possible assistance to expedite the response to the query.

According to an embodiment of the present invention, the contact manager computer system 228 includes certain modules, such as, but is not restricted to, a monitoring module 232, an aggregated context information generation module 236 and a display module 240. In some embodiments, one or more of the monitoring module 232, the aggregated context information generation module 236 and the display module 240 may be implemented by one or more software processes running on the server 110. The server 110 may implement one or more software processes by use of the processor 157 being suitably programmed by use of software instructions stored in the memory 155 coupled to the processor 157.

The monitoring module 232 may monitor contexts of a customer on a web browser, and of related context information of the customer and/or agent. Actions by the customer and/or the agent that may be monitored include web sites that are visited (including by an agent researching a problem or searching for outside resources), the content of communications, the tone of communication, and so forth. The agent ordinarily will be performing the monitored actions in order to assist the customer. More than one agent may be assisting the customer, and the customer is not necessarily aware of all the agents who are assisting the customer. In an embodiment of the present invention, the customer may be a potential customer of the contact center 100. The customer may be an existing customer of the contact center 100, in another embodiment of the present invention. The web browser may be a Web Real Time Communication (WebRTC) enabled browser, in an embodiment of the present invention. The WebRTC is a technology that enables media sessions between web browsers through data channels (e.g., voice, video, data flow, etc.).

Other techniques having a functionality of WebRTC may also be used by using plug-ins installed at web browsers of the customer and the agents of the contact center. Plug-ins could be used instead of the WebRTC data channel to send information that will be stored in the aggregated context. Although WebRTC ties the browser activity together with the communications session that follows the browsing activity, equivalent functionality may be achieved if the customer is a registered customer, such that after the customer has logged into the web site and before browsing, the enterprise is able to look up the customer's phone number when their contact arrives at the enterprise.

The contexts of the customer, including context information, may include, but is not limited to, a browsing duration, session information, shopping cart content, cookie information, an Internet Protocol (IP) address, a browsing history for a product and/or service, a customer's location, and so forth. Contexts may also include inferences, conjecture, and conclusions drawn from other contexts, including WebRTC contexts. In an embodiment of the present invention, the WebRTC contexts may be monitored by using a customer's side snap-in. A snap-in may be known as an installable software module (e.g., a plug-in), which may be added to a host software such as a web browser or other application program. For example, a customer is browsing on an enterprise's website from the past 25 minutes and is looking for a product range, such as a television. That information is monitored by the monitoring module 232. In an embodiment of the present invention, the monitoring of the web WebRTC contexts of the customer is carried out in a real-time environment. In some embodiments, data is transferred from the customer side to the data store using a WebRTC data channel. In other embodiments, the context of a registered customer is updated by the web server when the customer downloads certain web pages of interest from the web server.

Further, the monitoring module 232 may receive the contexts, and start gathering context information of the customer and/or agent, when the customer initiates a compatible communication session with the contact center 100. For example, when a customer clicks on a contact button on a website associated with the contact center 100, contexts (and associated context information) associated with the customer is received by the monitoring module 232. In another embodiment of the present invention, the monitoring module 232 may receive the contexts (and context information) of a customer in parallel with a media session of the customer with an agent of the contact center 100. For example, if a customer is using a WebRTC audio channel to connect to an agent of the contact center 100, then this secured channel may be used to gain WebRTC contexts of the customer. In an embodiment of the present invention, the WebRTC contexts (and context information) of the customer may be received by a third party.

The monitoring module 232 may further store the context information (e.g., browsing data) in the database 114 of the contact center 100. In an embodiment of the present invention, the context information may be stored in a Context Store (CS) of the contact center 100. The Context Store may be stored in database 114. The context information of each customer may be stored as an entry in a Context Store (CS) with a unique ID for each session of the customer. The session may be a web browsing session of a customer on a website of an enterprise, in an embodiment of the present invention.

The aggregated context information generation module 236 may analyze the context information stored in the database 114 of the contact center 100. In an embodiment of the present invention, the context information of the customer and/or agent is analyzed and relevant words or phrases are selected as keywords. In an embodiment of the present invention, a contact center desktop service snap-in, installed at an agent's desktop or a work station, may analyze the context information for a customer communication session.

Further, the aggregated context information generation module 236 may format the keywords of the context information, in an embodiment of the present invention. The formatting of words and/or phrases may include, but is not limited to, a highlight, an underline, a bold, and so forth.

In an embodiment of the present invention, a contact center desktop service snap-in may analyze the context information for a customer communication session. The aggregated context information generation module 236 may utilize the formatted context information of a customer for near future communication session with the customer. In an embodiment of the present invention, the future communication may include a communication session that may initiate within, but is not limited to, one minute, two minutes, three minutes, etc. Analysis of the context information may include inferences, conjectures and conclusions about the customer's future needs based upon the context information. For example, suppose a customer browses an auto maker's web site and general information about hybrid vehicles. In that case, embodiments may infer, hypothesize or conclude that the customer will be interested in hybrid vehicles offered by the auto maker, and will proactively retrieve information related to government purchase incentives and tax breaks available to customers.

Further, the aggregated context information generation module 236 may dynamically generate an aggregated context information based on the context information from the contexts of the customer. The aggregated context information may include all the appropriate instructions that may be necessary for an agent of a contact center to improve handling of an incoming contact and to take the contact towards a successful conclusion. The instructions may include, but is not limited to, suggested modifications for an agent to handle an incoming contact. In an embodiment of the present invention, the aggregated context information generation module 236 may generate a new aggregated context information based on the context information of the customer.

The aggregated context information generation module 236 may select an aggregated context information and then modify it by using the monitored contexts and context information of the customer and/or agent therefrom, and/or data of the customer. The selected aggregated context information may be selected based on the monitored contexts of the customer, in an embodiment of the present invention. Further, the aggregated context information generation module 236 may add selected phrases and/or words to the selected aggregated context information, in an embodiment of the present invention.

In another embodiment of the present invention, the aggregated context information generation module 236 may add instructions regarding communication with a customer to the aggregated context information. For example, if aggregated context information indicates that the customer is attempting to purchase a product such as insurance that must be handled by an agent with specific licensing qualifications, the requirements may be discussed with the customer. The aggregated context information generation module 236 may customize an aggregated context information based on a contractual situation, in yet another embodiment of the present invention. For example, an aggregated context information is selected, and the formatted context information is used to tailor the selected aggregated context information.

Further, the aggregated context information generation module 236 may store the generated and/or modified aggregated context information in the database 114 of the contact center 100.

The display module 240 may display the aggregated context information to an agent of the contact center 100. In an embodiment of the present invention, the aggregated context information may be displayed to an agent of the contact center 100 when the customer initiates a communication session with the agent. For example, context information is harvested from WebRTC contexts of the customer and an aggregated context information is generated, which is then displayed to an agent when the customer clicks on a "contact me" button on the web browser. Further, the display module 240 may display the aggregated context information (as well as inferences, conjectures and conclusions based upon the aggregated context information) on a desktop or a workstation of the agent handling the communication session with the customer, in an embodiment of the present invention. The aggregated context information may be provided to the agent on a telephone call, through an email, a text message, a screen pop-up, and the like, in another embodiment of the present invention.

Figure 3:
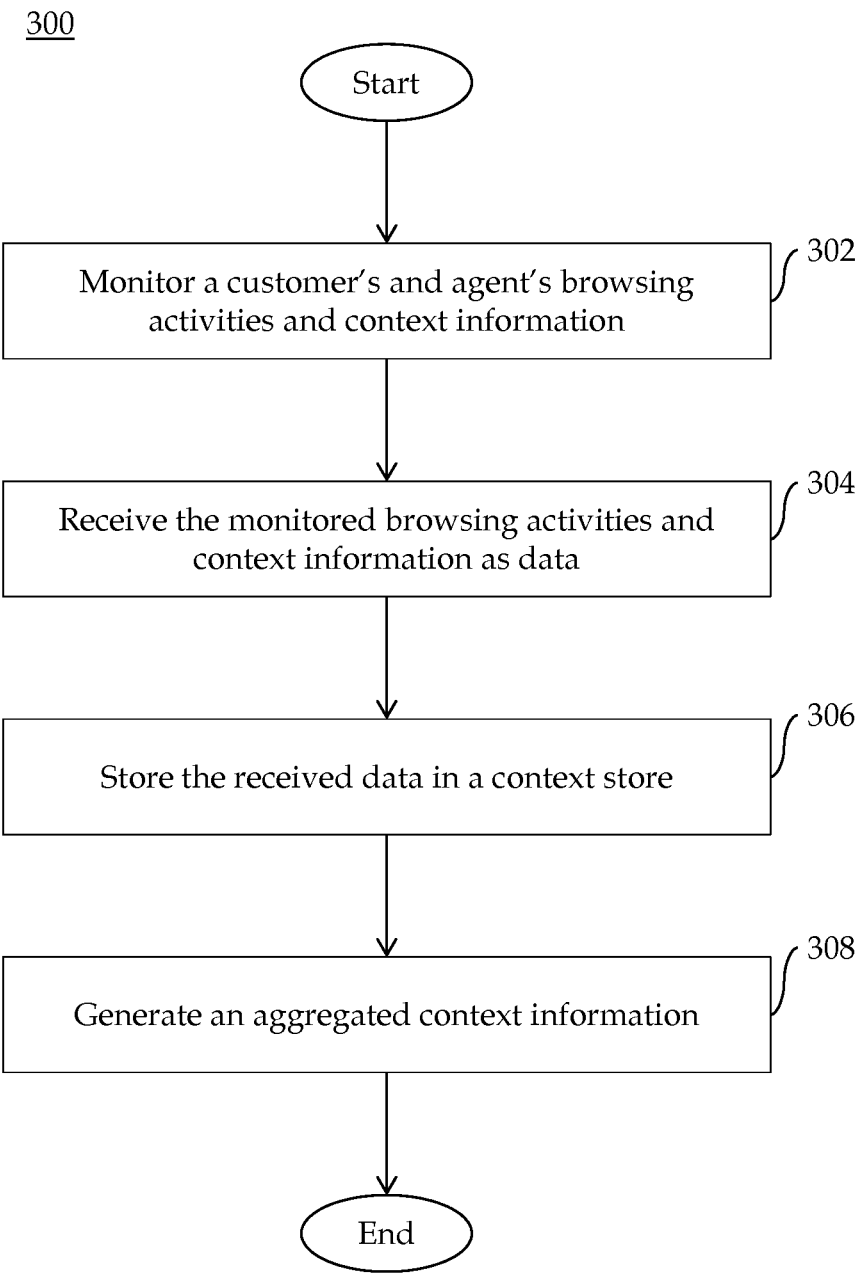
FIG. 3 depicts a flowchart of a method for generating an aggregated context information, according to an embodiment of the present invention.

FIG. 3 depicts a flowchart of a method for generating an aggregated context information, according to an embodiment of the present invention.

At step 302, a contact manager system 228 monitors contexts of a customer and/or agent, and related context information of the customer and/or agent on a web browser. The web browser may be a WebRTC enabled web browser, in an embodiment of the present invention. The contexts of the customer, including context information, may include, but is not limited to, a browsing duration, session information, shopping cart content, cookie information, an Internet Protocol (IP) address, a browsing history for a product and/or service, a customer's location, and so forth. In an embodiment of the present invention, the contexts may be monitored by using a customer's side snap-in installed in the communication device of the customer. In an embodiment of the present invention, the monitoring of the web contexts and context information of the customer is carried out in a real-time environment.

At step 304, the contact manager system 228 receives the monitored customer's activities and context information. The monitored contexts (and related context information) of the customer may be received as browsing data via a WebRTC data channel. In an embodiment of the present invention, the contact manager computer system 228 receives the browsing data when the customer initiates a WebRTC session with an agent of the contact center 100. For example, when a customer clicks on a contact button on a website, browsing data associated with the customer is received. In another embodiment of the present invention, the contact manager computer system 228 receives the browsing data of the customer in parallel with a media session of the customer with an agent of the contact center 100. The browsing data of the customer may be received by a third party.

Next, at step 306, the contact manager computer system 228 stores the context information in a Context Store (CS) of the contact center 100. The context information of each customer may be stored as an entry in a Context Store (CS) snap-in with a unique ID for each session of the customer. The session may be a web browsing session of a customer on a website of an enterprise, in an embodiment of the present invention.

At step 308, the contact manager system 228 generates an aggregated context information based on the context information of the customer and/or agent. In an embodiment of the present invention, the contact manager computer system 228 generates a new aggregated context information based on the context information of the customer and/or agent. For example, if a new customer is browsing for an air conditioner on a website of an enterprise, then based on stored context information a new aggregated context information is generated to provide services to the customer, which may result in a sale of the product.

The contact manager computer system 228 selects an aggregated context information and then modifies it by using the stored context information of the customer and/or agent. In an embodiment of the present invention, the contact manager computer system 228 may add relevant phrases and/or words to an aggregated context information. For example, if the customer is interested in buying a television and is frequently searching for it on an enterprise's website then information about Energy Star features relevant for the communication session is added in the selected aggregated context information.

In an embodiment of the present invention, a contact center desktop service snap-in may analyze the context information and may notice and/or select relevant words, or phrases for a customer communication session. Further, in an embodiment of the present invention, a speech service snap-in may be used to check for relevant phrases and/or words that are specifically required for a customer communication session and may import these phrases and/or words from the context store.

Figure 4:
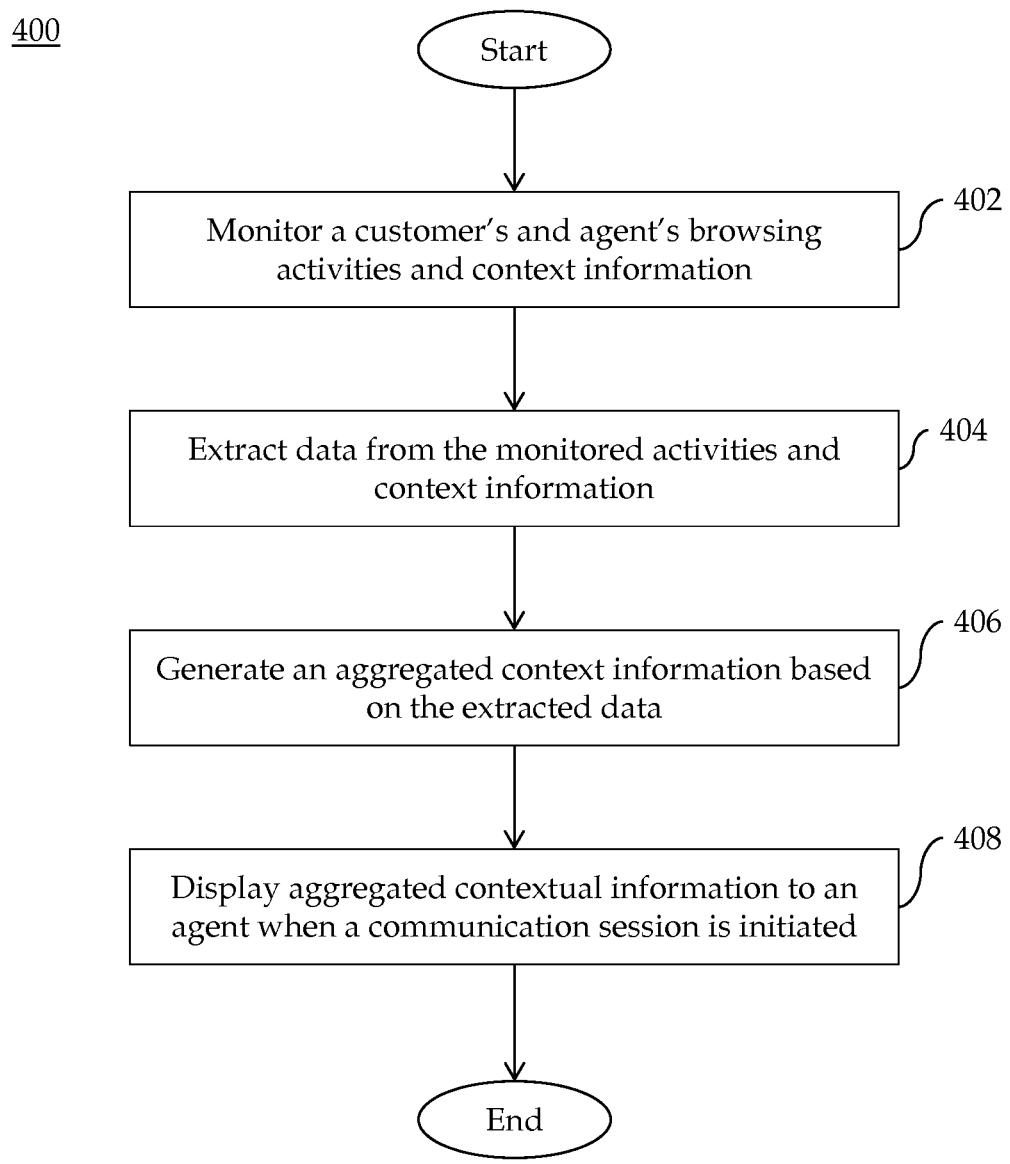
FIG. 4 depicts a flowchart of a method for guiding an agent during a communication session, according to an embodiment of the present invention.

FIG. 4 depicts a flowchart of a method 400 for guiding agents during a communication session, according to another embodiment of the present invention.

At step 402, a contact manager system 228 monitors contexts of a customer and/or agent and context information therefrom on a web browser. The web browser may be a WebRTC enabled web browser, in an embodiment of the present invention. The contexts (and thus context information) of the customer may include, but is not limited to, duration of browsing, session information, shopping cart content, cookie information, an Internet Protocol (IP) address, browsing history for a product and/or service, a customer's location, and so forth. In an embodiment of the present invention, the contexts and context information may be monitored by using a customer's side snap-in. In an embodiment of the present invention, the monitoring of the web contexts and context information of the customer is carried out in a real-time environment.

At step 404, the contact manager computer system 228 extracts context information from the monitored contexts of the customer. In an embodiment of the present invention, the contexts and context information of the customer are analyzed and relevant words or phrases are extracted as browsing data. For example, WebRTC contexts of a customer indicate the customer is browsing for a television from past 25 minutes then "television" and browsing duration, i.e., "25 minutes", are extracted as relevant browsing data. In an embodiment of the present invention, a contact center desktop service snap-in may analyze the WebRTC contexts for a customer communication session. Embodiments may distinguish browsing duration from idle time because idle time will be devoid of any customer action indicative of reading or similar transfer of information, such as scrolling up/down, mouse clicks, typing, etc.

Next, at step 406, the contact manager computer system 228 generates an aggregated context information based on the extracted browsing data. In an embodiment of the present invention, the contact manager computer system 228 generates a new aggregated context information based on the browsing data of the customer. For example, if a new customer is browsing for a cell phone on a website of an enterprise, then based on stored browsing data a new aggregated context information is dynamically generated to provide services to the customer, which may result in a sale of the product.

In another embodiment of the present invention, the contact manager computer system 228 selects an aggregated context information and then modifies it by using the stored context information of the customer and/or agent. In an embodiment of the present invention, the contact manager computer system 228 may add additional relevant to the selected aggregated context information (e.g., legal disclaimers). For example, if the customer is interested in buying a television and is frequently searches for it on an enterprise's website then a product comparison of selected television models may be added to the selected aggregated context information. In an embodiment of the present invention, a contact center desktop service snap-in may analyze the context information and may notice and/or select relevant words, or phrases for a customer communication session. Further, a speech service snap-in may be used to check for relevant phrases and/or words that are specifically required for a customer communication session and may import these phrases and/or words from the context store, in an embodiment of the present invention.

At step 408, the contact manager computer system 228 displays the aggregated context information to an agent of the contact center 100. In an embodiment of the present invention, the aggregated context information may be displayed to an agent of the contact center 100 when a communication session is initiated with the agent (e.g., initially by the customer, or by an agent if a contact is transferred). For example, context information is harvested from the WebRTC contexts of the customer and an aggregated context information is generated, which is then displayed to an agent when the customer clicks on a "contact me" button on the web browser. Further, the contact manager system 228 may display the aggregated context information on a desktop or a workstation of the agent handling the communication session with the customer, in an embodiment of the present invention. The aggregated context information may be provided to the agent on a telephone call, through an email, a text message, a screen pop-up, and the like, in another embodiment of the present invention. Method 400 concludes at the end of step 408.

Figure 5:
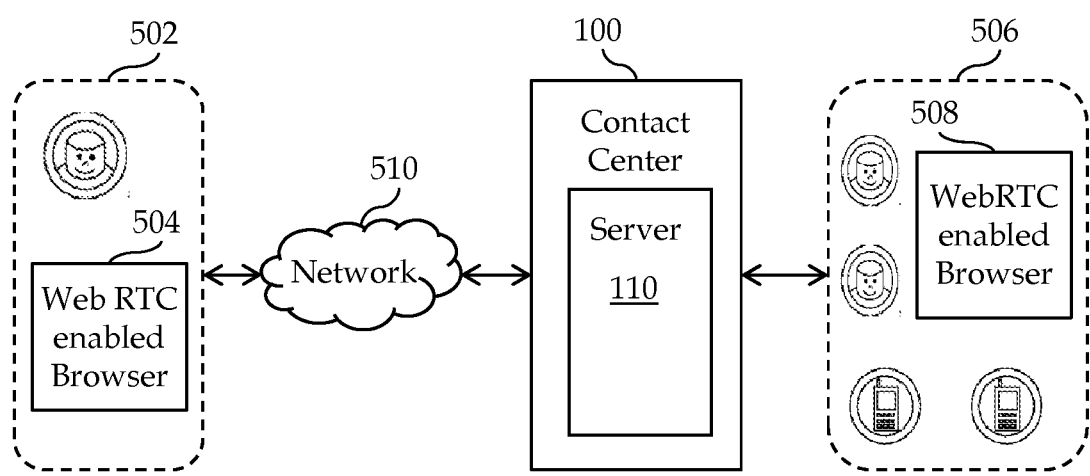
FIG. 5 illustrates an exemplary architecture in which various embodiments may be implemented, according to an embodiment of the present invention.

FIG. 5 illustrates an exemplary architecture in which various embodiments may be implemented, according to an embodiment of the present invention. A customer at a user terminal 502 may use a WebRTC enabled browser 504 for browsing products and/or services provided by an enterprise, and to communicate with an agent of the contact center 100 at an agent terminal 506. The agent at the agent terminal 506 may also use a WebRTC enabled browser 508 for communicating with the customer. The agent terminal 506 may be configured to provide customer support services to the customer at the user terminal 502.

The contact center 100 may be configured to support communication modes by using a wide variety of devices for the user terminals 502, including devices operating over analog or digital communication channels designed for the delivery of information to the customer in an audio form, a visual form (including static and dynamic visual elements), or any combination thereof. For example, in some embodiments of the present invention, the contact center 100 may be configured to support the user terminal 502 consisting of a general purpose computer device connected to a data network 510.

In particular, the contact center 100 connects and manages the communication session between the user terminal 502 and the agent terminal 506. Although the agent terminal 506 is connected to the network 510 via the contact center 100, the various embodiments are not limited in this regard. Rather, in some embodiments, one or more of the agent terminals 506 may be directly connected to the network 510 and may communicate with the contact center 100 via the network 510. The agent terminal 506 like the user terminal 502 may be configured to support real-time and/or time-shifted communication modes. Accordingly, the description above regarding the communication modes and devices for the user terminal 502 is equally applicable to the agent terminal 506.

The server 110 of the contact center 100 includes the contact manager computer system 228. The WebRTC enabled browsers 504 and 508 (or other compatible browsers) are configured to make point to point contacts between the agent and the customer. The contact manager computer system 228 is configured to harvest contexts and related context information of the customer from the WebRTC enabled browser 504. The contexts (and context information) of the customer are then selected and formatted to extract relevant phrases and/or words. The extracted phrases and/or words are then be used to generate an aggregated context information. Further, when the customer initiates a communication session with an agent at the agent terminal 506, the aggregated context information is provided to an agent for handling the communication session.

The exemplary embodiments of this present invention have been described in relation to a contact center. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, changes, additions, and omissions to this sequence can occur without materially affecting the operation of embodiments of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with embodiments of the present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI aggregated context information, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, it is not limited to such standards and protocols. Other similar standards and protocols not mentioned herein are in existence and considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Also, although the present invention is described in terms of exemplary embodiments, it should be appreciated those individual aspects of the present invention can be separately claimed.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A server comprising a contact manager system to dynamically generate an aggregated context information, the server comprising a processor and a memory, wherein the processor executes programming code stored in memory to:

determine one or more communication contexts of a customer interacting with a contact center during one or more communication sessions;
   determine one or more communication contexts of a contact center agent assisting the customer;
   obtain customer context information from the one or more determined communication contexts of the customer;
   obtain agent context information from the one or more determined communication contexts of the agent;
   store the customer context information and the agent context information;
   generate the aggregated context information from the obtained customer context information and the obtained agent context information;
   dynamically modify the aggregated context information;
   create an inference from the dynamically modified aggregated context information; and
   cause display of a result of the inference to an agent, wherein the result comprises a dynamically generated control resulting from the inference, which control is displayed to the agent and activatable by the agent to transfer the customer to a different agent.

2. The server of claim 1, wherein the one or more determined communication contexts of the customer and the one or more determined communication contexts of the agent are determined from a Web Real Time Communication (WebRTC) communication session using a WebRTC enabled browser.

3. The server of claim 1, wherein the processor when executing the programming code receives the one or more determined communication contexts of the customer through a separate communication data channel.

4. The server of claim 1, wherein the processor when executing the programming code dynamically modifies the aggregated context information based on the obtained customer context information of the determined communication contexts of the customer.

5. The server of claim 4, wherein the processor when executing the programming code stores the aggregated context information in a database.

6. The server of claim 5, wherein the processor when executing the programming code causes the aggregated context information to be displayed to the agent when the customer initiates a communication session and the aggregated context information is generated prior to the customer initiating the communication session.

7. The server of claim 1, wherein the processor when executing the programming code further reserves a resource based upon the inference.

8. The server of claim 1, wherein the processor when executing the programming code dynamically modifies the aggregated context information to include a conjecture drawn from the obtained customer context information of the one or more determined communication contexts of the customer.

9. The server of claim 8, wherein the conjecture includes a confidence score of the conjecture.

10. The server of claim 1, wherein the processor when executing the programming code stores context information for each customer web browsing session with a unique ID.

11. The server of claim 1, wherein the dynamically modified context information is not displayed to the agent.

12. A processor-implemented method to dynamically generate an aggregated context information, the method comprising:

determining by the processor one or more communication contexts of a customer interacting with a contact center;

obtaining by the processor customer context information from the one or more determined communication contexts of the customer;

determining by the processor one or more communication contexts of a contact center agent assisting the customer;

obtaining by the processor agent context information from the one or more determined contexts of the agent;

generating by the processor the aggregated context information from the obtained customer context information and the obtained agent context information;

dynamically modifying the aggregated context information;

inferring by the processor an inference from the dynamically modified aggregated context information; and displaying a result of the inference to an agent, wherein the result comprises a dynamically generated control resulting from the inference, which control is displayed to the agent and activatable by the agent to transfer the customer to a different agent.

13. The method of claim 12, wherein the one or more determined communication contexts of the customer and the one or more determined communication contexts of the agent are determined from a Web Real Time Communication (WebRTC) session using a WebRTC enabled browser.

14. The method of claim 12, further comprising dynamically modifying the aggregated context information based on the obtained customer context information of the one or more determined communication contexts of the customer.

15. The method of claim 14, further comprising storing the aggregated context information in a database.

16. The method of claim 15, wherein the aggregated context information is displayed to the agent when the customer initiates a communication session, and the aggregated context information is generated prior to the customer initiating the communication session.

17. The method of claim 12, further comprising modifying the aggregated context information to include a conjecture drawn from the obtained customer context information of the one or more determined communication contexts of the customer.

18. The method of claim 17, wherein the conjecture includes a confidence score of the conjecture.

19. The method of claim 12, further comprising storing context information for each customer web browsing session with a unique ID.

20. The method of claim 12, wherein the dynamically modified context information is not displayed to the agent.

* * * * *